United States Patent [19]

Springer

[11] Patent Number: 4,480,843
[45] Date of Patent: Nov. 6, 1984

[54] POLYMERIC ANNULAR SNUBBING APPARATUS

[75] Inventors: Virgil E. Springer; John J. Garner Jr. both of Corsicana, Tex.

[73] Assignee: Regal International, Inc., Corsicana, Tex.

[21] Appl. No.: 541,169

[22] Filed: Oct. 12, 1983

[51] Int. Cl.³ .................... F16J 15/10; F16C 29/00
[52] U.S. Cl. .................................... 277/31; 277/5; 277/193; 277/228; 277/1; 308/4 A; 166/173; 166/176
[58] Field of Search ............... 166/141, 173, 170, 176; 277/5, 30, 1, 31, 198, 228, 193, 195; 308/4 A

[56] References Cited

U.S. PATENT DOCUMENTS

| | | | |
|---|---|---|---|
| 870,616 | 11/1907 | Brazelle | 277/5 |
| 3,608,633 | 9/1971 | Talley | 166/170 X |
| 4,190,300 | 2/1980 | Scalzi | 308/4 A |
| 4,345,769 | 8/1982 | Johnston | 277/31 |
| 4,361,185 | 11/1982 | Biffle | 277/31 X |

Primary Examiner—Robert S. Ward
Attorney, Agent, or Firm—Gerald G. Crutsinger; John F. Booth; Monty L. Ross

[57] ABSTRACT

For use in hydraulic workover operations for oil and gas wells, a snubbing element is provided that is made entirely of polymeric material such as polyurethane. According to a preferred embodiment of the invention, the strength and rigidity supplied to the snubbing element in the prior art metallic support ring is now provided by molding that portion of the polymeric annular snubbing element from a polymeric material having a higher density and hardness than that of the polymeric sealing member. The polymeric annular snubbing element thus comprises a high density polymeric support member and a relatively lower density polymeric sealing member.

18 Claims, 3 Drawing Figures

POLYMERIC ANNULAR SNUBBING APPARATUS

TECHNICAL FIELD

This invention relates to polymeric apparatus for use in hydraulic workover operations for oil and gas wells. One aspect of the invention relates to polymeric apparatus for use in snubbing pressurized oil and gas wells during workover. Another aspect of the invention relates to polymeric apparatus for use in wiping production tubing as the tubing is removed from a pressurized well. A further aspect of the invention relates to polymeric snubbing elements and pipe wipers comprising an expandable polymeric sealing member that is integrally connected to a polymeric support member having a relatively higher density. Yet another aspect of the invention relates to snubbers and pipe wipers that comprise molded polyurethane.

BACKGROUND ART

The snubbing element of the invention is typically used during hydraulic workover operations in gas wells having downhole pressures ranging up to about 3,200 psi or greater. The apparatus can also be used as a pipe wiper in high pressure wells in conjunction with conventional snubbing apparatus utilizing spaced apart blowout preventers. Historically, workover operations in a pressurized well were only performed after pumping heavy drilling mud into the well to force the gas back into the formation, thereby alleviating the borehole pressure. However, this procedure can kill or damage the well, particularly in delicate formations, thereby preventing or severely reducing subsequent production. As a solution to this problem, snubbing elements were developed which permit such wells to be worked under pressure without fear of killing production or of releasing explosive gases into the atmosphere.

Conventional snubbing elements typically comprise a precast, nonsparking metallic support member, usually made of brass or bronze, onto which a polymeric sealing member is molded. The metallic support member comprises a toroidal outer ring that defines the major diameter of the snubbing element, and an inwardly extending web portion that defines a centrally disposed axial bore. The web portion is further provided with a plurality of circumferentially spaced ports and/or lugs to assist in forming a mechanical interlock between the metallic support member and the polymeric sealing member. The polymeric sealing member is typically formed by molding a flowable polymeric resin such as polyurethane around the metallic support member according to conventional molding techniques. When the snubbing element is removed from the mold, the relatively smooth, outwardly facing surface of the toroidal ring is the only portion of the metallic support member which is not embedded in the polymeric material.

During use, the conventional snubbing element is desirably installed inside a steel bowl disposed beneath the blowout preventers at the wellhead. The sealing member of the snubbing element fills the annulus around the tubing and provides sealing engagement with the tubing as it is run into and out of the hole. The metallic outer ring at the top of the snubbing element is used for clamping the snubbing element in its proper alignment inside the bowl. Representative conventional snubbing elements are commercially available from Supreme Rubber Products Co., of Houston, Tex. and from The Altair Co. of Richardson, Tex.

The use of a metallic member was heretofore believed necessary to obtain the desirable degree of strength and resistance to pressure. Moreover, numerous difficulties have been encountered in manufacturing the conventional snubbing elements, and the separately cast nonsparking metallic support member significantly increases the cost of the parts.

SUMMARY OF THE INVENTION

According to the present invention, a snubbing element is provided that is made entirely of polymeric material such as polyurethane. According to a preferred embodiment of the invention, the strength and rigidity previously supplied to the snubbing element by the metallic support ring is now provided by molding that portion of the polymeric annular snubbing element from a polymeric material having a higher density and hardness than that of the polymeric sealing member.

According to one embodiment of the invention, a polymeric annular snubbing element is provided that comprises a high density polymeric support member and a relatively lower density polymeric sealing member.

According to another embodiment of the invention, a unitary polymeric annular snubbing element is provided that comprises a polymeric support member and a relatively softer polymeric sealing member that is either chemically or mechanically bound to the polymeric support member.

According to yet another embodiment of the invention, a polymeric annular snubbing element is provided that comprises an axially disposed wiping bore, the circumference of which is defined by a polymeric support member at one end thereof, and by a polymeric sealing member at the other end thereof, the polymeric supporting member and polymeric sealing member being interconnected in a substantially contacting and continuous relation to each other.

According to yet another embodiment of the invention, a polymeric annular snubbing element is provided for use in working subterranean wells while under pressure, comprising a relatively high density polymeric support member and a relatively low density polymeric sealing member, the polymeric support member being adapted to support and maintain the snubbing element within the annulus defined by the exterior of the production tubing and the interior of the casing.

According to yet another embodiment of the invention, a polymeric annular snubbing element is provided for use in working subterranean wells under pressures ranging up to about 3,000 psi or greater, the element preferably comprising a centrally disposed axial bore adapted to wipe the tubing which passes therethrough, an expandable outwardly facing sealing lip adapted to provide sealing engagement with the inside walls of the casing, and a relatively harder polymeric support ring adapted to be clamped inside a bowl disposed at the wellhead.

The apparatus disclosed herein will permit live subterranean wells having substantial downhole pressures to be safely worked with reduced risk of (hydrocarbon) leakage through the annulus disposed between the production tubing and the wellbore.

Other objects and improvements of the invention are further described and explained in the specification below in relation to the accompanying drawings.

BRIEF DESCRIPTION OF THE DRAWINGS

The apparatus of the invention is further described and explained in relation to the following drawings wherein.

Like numerals are used to describe like parts in all figures of the drawings.

DESCRIPTION OF A PREFERRED EMBODIMENT

Figure 1:
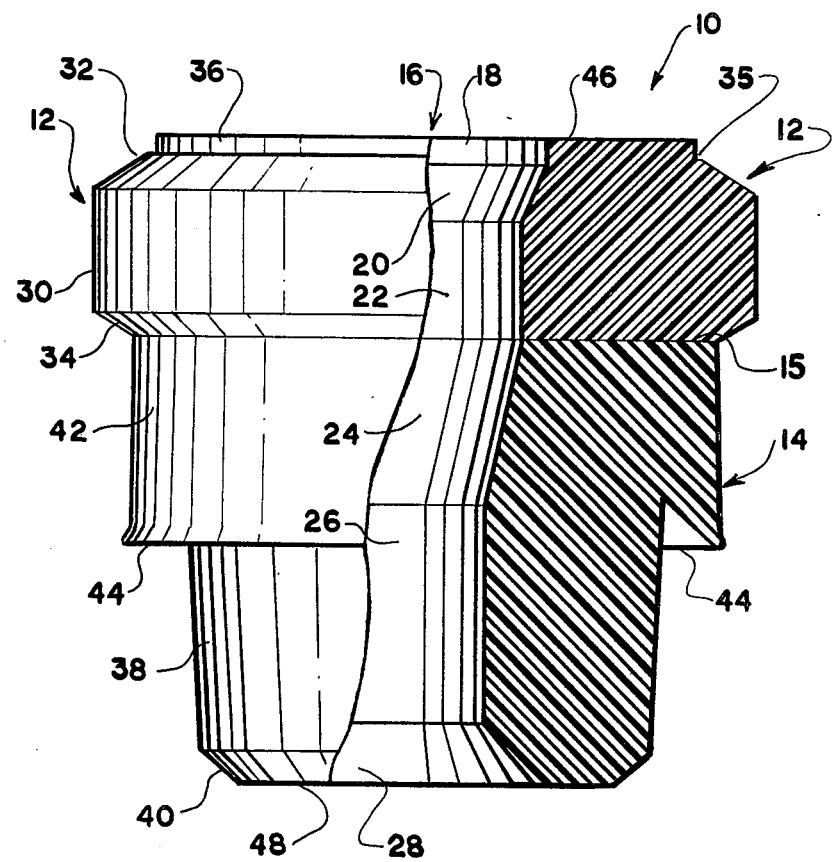
FIG. 1 depicts an elevation view, partially in section, of the polymeric annular snubbing element of the invention.
Figure 2:
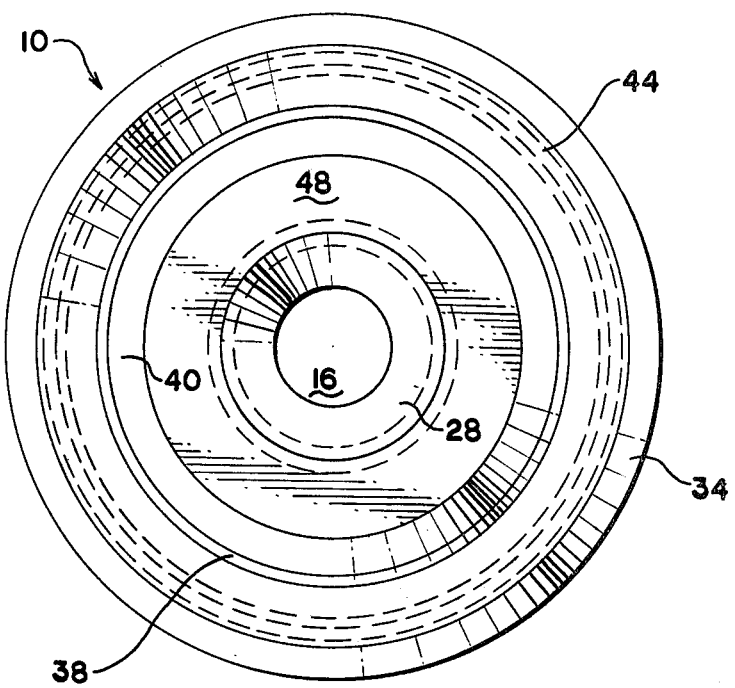
FIG. 2 depicts a bottom view (not in section) of the apparatus of FIG. 1.
Figure 3:
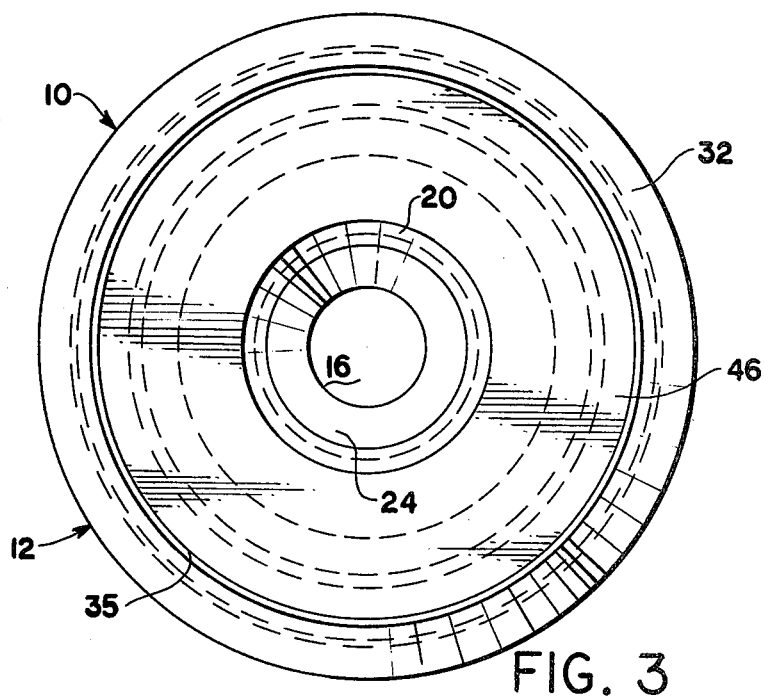
FIG. 3 depicts a plan view (not in section) of the apparatus disclosed in FIGS. 1 and 2.

Referring to FIGS. 1–3, polymeric annular snubbing element 10 preferably comprises annular polymeric support member 12 and annular polymeric sealing member 14. According to a preferred embodiment of the invention as shown in FIG. 1, support member 12 and sealing member 14 are cooperatively aligned and interconnected at interface 15, which is substantially transverse to axial bore 16. As shown in FIG. 1, the lowermost edges of support member 12 and the uppermost edges of sealing member 14 are desirably contacting and coextensive.

Annular polymeric support member 12 preferably further comprises a centrally disposed axial bore 16 bounded by vertical wall portions 18, 22 and inclined wall portion 20. The outward facing surfaces of support member 12 are defined by circumferentially extending vertical wall portions 30, 36, circumferentially extending inclined wall portions 32, 34, circumferentially extending shoulder 35, and upper surface 46. As shown in the sectional view of FIG. 1 where a portion of polymeric annular snubbing element 10 has been broken away, support member 12 preferably comprises a unitary, substantially continuous piece of polymeric material. A preferred polymeric material for use as support member 12 of the invention is polyurethane. Although it is understood that other polymeric materials can also be used, subject to the other teachings contained herein. Plus, for example, satisfactory polymeric materials for use in making support member 12 of the invention should preferably exhibit excellent hardness, impact resistance, abrasion resistance, and resistance to degradation by organic solvents.

Referring again to FIGS. 1–3, polymeric annular sealing member 14 preferably further comprises a centrally disposed axial bore that is defined by inclined wall portions 24, 28 and vertical wall portion 26. Although the configuration of the wall portions defining the centrally disposed, axial bore 16 of support member 12 and sealing member 14 as shown in FIGS. 1–3 has proved effective for use in the apparatus of the invention and is a preferred configuration, it is understood that other configurations can also be used within the scope of the invention, provided that the configuration of the wall portions defining the circumference of axial bore 16 can provide pressure-containing, sealing engagement between sealing member 14 and the tubing that is passed therethrough. The outward facing surfaces of polymeric annular sealing member 14 preferably comprise circumferentially extending, substantially axially oriented wall portions 38, 42 that are interconnected by sealing lip 44. The outer most edge of sealing lip 44 preferably has a diameter slightly greater than that of wall portion 42 to aid in providing pressure-containing sealing engagement between sealing member 14 and the well bore. Circumferentially extending inclined surface 40 preferably connects axially oriented wall portion 38 with transversely oriented lower face 48.

As shown in FIG. 1 where a portion of polymeric annular snubbing element 10 has been broken away to better illustrate the cross section of support member 12 and sealing member 14, sealing member 14 is preferably unitarily molded from a polymeric material such as polyurethane. The polymeric material used in making sealing member 14 should also exhibit good resistance to wear, abrasion and attack by organic solvents. Furthermore, the polymeric used in sealing member 14 should exhibit sufficient elasticity to continuously provide pressure-containing, sealing engagement between interior wall portion 26 and the outside wall of tubing passed therethrough. As a string of tubing is run into or out of a wellbore, tubing segments of a given diameter and threaded joints having a relatively larger diameter will successively pass through axial bore 16 of snubbing element 10.

Similarly, the polymeric material employed for use as sealing lip 44 of sealing member 14 should exhibit sufficient elasticity so that it can expand to provide pressure-containing, sealing engagement with the interior surface of the casing, vessel or other apparatus through which the tubing is passed into or out of the wellbore.

As shown in FIG. 1, support member 12 and sealing member 14 are cooperatively aligned, and are desirably bound or interconnected along interface 15. Although support member 12 and sealing member 14 are both preferably made of polyurethane, the polyurethane employed in sealing member 12 will preferably have a greater hardness and higher density than that used in sealing member 14. During use, snubbing element 10 is typically installed in the position shown in FIG. 1. The outward facing surfaces of support member 12 are utilized for clamping or otherwise securing snubbing element 10 into the desired positional alignment over the wellbore. For this reason, support member 12 is preferably made of a material that is more resistant to elastic deformation than the material employed for sealing member 14. A preferred polymer for use as support member 12 is polyurethane having a hardness ranging from about 50 to about 60 Shore D. A preferred material for use as sealing member 14 is polyurethane having a hardness ranging from about 80 to about 90 Shore A.

Snubbing element 10 is preferably made by molding polyurethane prepolymers in a single mold cavity. According to a preferred embodiment of the invention, a mold cavity adapted to mold a snubbing element 10 having a desired configuration, such as that shown in FIG. 1, is maintained in a position that is inverted relative to the position shown in FIG. 1. The urethane prepolymer and the other conventionally known, commercially available components needed for molding support member 12 are thereafter introduced into the mold and permitted to begin hardening. After the polymer has begun to set up, but before it has hardened, the urethane prepolymer and other components for making the polymeric material of sealing member 14 are thereafter introduced into the mold on top of the polymer for support member 12. When introduced in this manner, the polymer of support member 12 and the polymer of sealing member 14 are desirably chemically bound along interface 15 therebetween. If the polymer of support member 12 is cured for too long prior to introducing the polymer of sealing member 14 into the mold, inadequate bonding may take place. Conversely, if the polymer of support member 12 is not sufficiently cured prior to introducing the polymer of sealing member 14 into the mold, undesirable cross-mixing can occur that can detrimentally affect the hardness of either support member 12, sealing member 14, or both.

Although sequential molding of support member 12 and sealing member 14 within a single mold is the preferred method for making snubbing element 10 of the invention, it is also possible within the scope of the invention to separately mold support member 12 and sealing member 14 and thereafter bond them together by an adhesive, or the like. Also, it is possible within the scope of the invention to premold a support member having ports and lugs such as those employed in the nonsparking, metallic support members of conventional snubbing elements 10, and thereafter place the premolded part into another mold where a relatively softer polymeric material is introduced and molded onto support member 12 to form sealing member 14.

The dimensions of snubbing element 10 of the invention can vary within the scope of the invention, and will necessarily depend upon the dimensions of the conventional drilling equipment with which snubbing element 10 is used. Other alternations and modifications of the invention will become apparent to one of ordinary skill in the art upon reading the present disclosure and it is intended to cover all such alterations and modifications as fall within the scope of the appended claims.

What is claimed is:

1. An annular polymeric snubbing element comprising an annular polymeric sealing member adapted to contain a pressurized fluid within the annular space between a string of production tubing and the casing in a well bore, said sealing member further comprising a centrally disposed axial bore further comprising an elastomeric material adapted to provide frictional engagement between said sealing member and said production tubing, and a circumferentially disposed, outward facing elastomeric sealing web adapted to provide pressure containing sealing engagement against the interior wall of said casing; and an annular polymeric support member adapted for use in maintaining said snubbing element in a desired positional alignment with respect to said well bore, said annular polymeric support member comprising a centrally disposed axial bore having a diameter at least as great as that of said polymeric sealing member; said annular polymeric support member comprising a polymeric material having a hardness greater than that of said annular polymeric sealing member; said annular polymeric sealing member and said annular polymeric support member being interconnected in such manner that one end of said annular polymeric sealing member is substantially coextensive with the adjacent end of said annular polymeric support member.

2. The snubbing element of claim 1 wherein said annular polymeric sealing member and said annular polymeric support member are chemically bound.

3. The snubbing element of claim 1 wherein said annular polymeric sealing member comprises an elastomeric polymeric material having a durometer ranging from about 80 to about 90 Shore A.

4. The snubbing element of claim 1 wherein said polymeric support member comprises a polymeric material having a durometer range of about 50 to about 60 Shore D.

5. The snubbing element of claim 1 wherein said annular polymeric sealing member comprises polyurethane.

6. The snubbing element of claim 1 wherein said annular polymeric support member comprises polyurethane.

7. The snubbing element of claim 1 wherein said annular polymeric sealing member and said annular polymeric support member cooperate to contain pressurized fluid within the annular space between the production tubing and the casing in a well bore at pressures ranging up to about 3,200 psi.

8. A snubbing element adapted to contain a pressurized fluid within the annular space between the production tubing in the surrounding well bore of an oil or gas well, the improvement comprising the use of an annular polymeric sealing member in cooperation with an annular polymeric support member, said annular polymeric support member comprising a polymeric material having a hardness that is relatively greater than that of said polymeric sealing member.

9. The snubbing element of claim 8 wherein said annular polymeric sealing member comprises polyurethane.

10. The snubbing element of claim 8 wherein said annular polymeric support member comprises polyurethane.

11. The snubbing element of claim 9 wherein said annular polymeric sealing member comprises polyurethane in a durometer ranging from about 80 to about 90 Shore A.

12. The snubbing element of claim 10 wherein said annular polymeric support member has a durometer ranging from about 50 to about 60 Shore D.

13. A pipe wiper adapted for use in wiping fluids from the exterior surface of tubing that is removed from a subterranean well, said pipe wiper comprising an annular polymeric sealing member and an annular polymeric support member, said sealing member and said support member being interconnected in coaxial alignment.

14. A method for making an annular polymeric snubbing element for use in maintaining pressurized fluids within an annular space between the well bore and a string of tubing disposed inside the well bore, said method comprising the steps of:
   a. molding an annular polymeric support member; and
   b. thereafter molding an annular polymeric sealing member so as to provide an interconnection between said support member and said sealing member, said sealing member comprising a polymeric material having a hardness that is less than that of said support member.

15. The method of claim 14 wherein said annular polymeric support member is molded from a polymeric material having a hardness ranging from about 50 to about 60 Shore D.

16. The method of claim 15 wherein said annular polymeric sealing member is molded from a polymeric material having a hardness ranging from about 80 to about 90 Shore A.

17. The method of claim 14 wherein said annular polymeric support member is molded from polyurethane.

18. The method of claim 14 wherein said annular polymeric sealing member is molded from polyurethane.

* * * * *